United States Patent
Wang

(10) Patent No.: US 12,330,203 B2
(45) Date of Patent: Jun. 17, 2025

(54) METHOD OF FORMING SHELL OF SOFT PACK BATTERY

(71) Applicant: HUANG CHIEH METAL COMPOSITE MATERIAL TECH. CO., LTD., New Taipei (TW)

(72) Inventor: Chin-Han Wang, New Taipei (TW)

(73) Assignee: HUANG CHIEH METAL COMPOSITE MATERIAL TECH. CO., LTD., New Taipei (TW)

( * ) Notice: Subject to any disclaimer, the term of this patent is extended or adjusted under 35 U.S.C. 154(b) by 471 days.

(21) Appl. No.: 17/959,178

(22) Filed: Oct. 3, 2022

(65) Prior Publication Data

US 2024/0109116 A1    Apr. 4, 2024

(51) Int. Cl.
*B21D 26/021*    (2011.01)
*H01M 50/224*    (2021.01)
*H01M 50/231*    (2021.01)

(52) U.S. Cl.
CPC ........ *B21D 26/021* (2013.01); *H01M 50/224* (2021.01); *H01M 50/231* (2021.01)

(58) Field of Classification Search
CPC .... B21D 26/02; B21D 26/021; B21D 26/027; B21D 26/031; B21D 24/005; B29C 44/105; B29C 44/58; B29C 49/0029
See application file for complete search history.

(56) References Cited

U.S. PATENT DOCUMENTS

| | | | | | |
|---|---|---|---|---|---|
| 3,159,693 | A | * | 12/1964 | Plymale | B29C 44/10 264/544 |
| 4,901,552 | A | * | 2/1990 | Ginty | B21D 26/055 72/60 |
| 5,749,254 | A | * | 5/1998 | Hall, Jr. | B21D 26/021 72/60 |
| 2008/0127697 | A1 | * | 6/2008 | Luckey | B21D 26/021 72/57 |

* cited by examiner

*Primary Examiner* — Teresa M Ekiert
(74) *Attorney, Agent, or Firm* — Chun-Ming Shih; LANWAY IPR SERVICES

(57) ABSTRACT

A method of forming a shell of a soft pack battery is provided. The method includes steps of adjusting temperature of a thin sheet material for the shell to a working temperature, applying a difference of fluid pressure to the thin sheet material as forming pressure, and a two-stage forming step. In a first-stage preforming step, a preform with a first depth is formed by the thin sheet material and at least one compensation portion is formed on the preform. In a second-stage final-forming step, the perform is molded into the final formed part with a second depth. Thereby the shell with a higher depth-thickness ratio is manufactured and the thin sheet material is uniformly deformed. The compensation portion is used for compensation of deformation at corners of the bottom of the final molded part. Thus thinning rate is less than 30% and yield rate is increased.

12 Claims, 7 Drawing Sheets

METHOD OF FORMING SHELL OF SOFT PACK BATTERY

BACKGROUND OF THE INVENTION

Field of the Invention

The present invention relates to a technique for manufacturing of a shell of a soft pack battery, especially to a method of forming a shell of a soft pack battery during packaging.

Description of Related Art

According to packaging materials for lithium-ion batteries, lithium-ion batteries are divided into hard pack lithium-ion batteries with metal case made of steel and aluminum and soft pack lithium-ion batteries with aluminum-plastic packaging such as aluminum laminated film (ALF) packaging.

The soft pack lithium-ion battery is also named pouch cell battery due to a layer of aluminum-plastic film shell on the lithium battery and having the following advantages:
1. high specific energy: the soft pack battery with lighter weight has a higher battery capacity, about 10-15% and 5-10% respectively compared with the same size steel shell battery and the aluminum shell battery.
2. good electrochemical performance and long service life
3. design flexibility: internal structure can be adjusted/customized according to product requirements.

In order to produce soft pack lithium-ion batteries, firstly a shell for mounting a lithium-ion battery core is manufactured. Most of aluminum plastic film used now are produced by cold pressing. The aluminum plastic film is passed through a fixed mold and pressed into a box with a cavity under a certain pressure. The aluminum plastic film which consists of an outer polyamide (PA) layer, adhesives, a middle aluminum (Al) layer, adhesive, and an inner heat sealing (cast polypropylene, CPP) layer is a thin multi-layer film. In other words, the aluminum plastic film is in a multi-layer composite structure (plastic/metal/plastic). After the pressing and molding process, the aluminum plastic film is easy to have flaws such as thinning, pinholes, and cracks, especially at corners of the cavity of the box. That means the manufacturing process of the shell of the soft pack lithium-ion battery using the aluminum plastic film now has the following challenges: 1. Materials with good elongation to avoid incomplete sealing or crack). 2. Poor yield rate of the shell in complicated shapes. 3. The shell is easy to crack when its depth-thickness ratio is no less than 30 or local thickness thinning rate is no less than 30% (≥30%) and problems of leakage or swelling further occur.

Refer to FIG. 1 and FIG. 2, shells of soft pack batteries produced using aluminum-plastic film available now are mainly divided into two groups, shells produced by molds with double mold cavity (FIG. 1) and shells produced by molds with single mold cavity (FIG. 2). The shell produced by the mold with double mold cavity includes an upper outer case 60a and a lower outer case 60b welded or adhered to each other at a connection area 61. It's not difficult to use aluminum-plastic film (multi-layered composite of plastic/metal/plastic) or sheet metal to form rectangular double-cavity soft pack battery by room temperature stamping. The shell with larger depth is easily produced and the problem of insufficient stamping depth is solved. However, such as the shell produced by the mold with double mold cavity has welding difficulties and leakage problem easily occurs at the welded position. As to the shell produced by the mold with single mold cavity, it includes a lower case 62a and a sealing cover 62b which is welded and adhered to a top of the lower case 62a for sealing the battery core in the lower case 62a. In contrast, the design of the single mold cavity not only increases energy density and allows use of the materials with different thickness, but also avoids the leakage problem caused by difficulties in welding in the shell produced by the mold with double mold cavity.

Although a rectangular shell 71 (as shown in FIG. 3) can be easily produced by the techniques available now, the shell with complicated shapes (such as a step-like shell 72 shown in FIG. 4) and the shell produced by the mold with single mold cavity have become design trends of the future due to increased energy density and product reliability. Yet the shell with complicated shapes will have difficulties in deformation due to complicated stress and thus local over-thinning or even breakage occurs easily. During hot stamping process, local thinning is even getting worse. Thus limited success is achieved and yield rate is poor.

In order to overcome the problems occurred during formation of the shell of the soft pack battery, refer to a technique disclosed in Chinese Pat. Pub. No. 109647971 A, "an apparatus and a method of forming lithium-ion battery shell by stamping of aluminum film" a technique which uses pre-stamping first and second-time stamping later is provided. Moreover, refer to Chinese Patent Pub. No. 107925019 "pouch type secondary battery and method of manufacturing the same", a pressure forming technique is revealed.

It should be noted that cold forming formability of the aluminum-plastic film is often evaluated by stamping depth which is a key factor in large-scale and large capacity development of the soft pack battery. Thus there is room for improvement and there is a need to provide a shell having larger stamping depth but without excessive thinning and breaking.

SUMMARY OF THE INVENTION

Therefore, it is a primary object of the present invention to provide a method of forming a shell of a soft pack battery by which the shell of the soft pack battery with a depth-thickness ratio no less than 75 (≥75) and local thinning rate no more than 30 (≤30%) is formed.

In order to achieve the above object, a method of forming a shell of a soft pack battery according to the present invention includes a material preparing step, a preforming step, and a final-forming step.

The material preparing step is a step of preparing a thin sheet material, a preform mold, and a final-forming mold. Two opposite sides of the thin sheet material are provided with a first surface and a second surface correspondingly. The preform mold and the final-forming mold are respectively provided with a preform mold cavity and a final-forming mold cavity. A first depth of the preform mold cavity is smaller than a second depth of the final-forming mold cavity.

The thin sheet material which is selected from the group consisting of aluminum-plastic film, stainless steel, and titanium is having a thickness of 0.02 mm~0.2 mm and an elongation at room temperature of 10%~20%.

The preforming step includes a step of adjusting the temperature of the thin sheet material to a working temperature and mounting the thin sheet material into the preform mold while the working temperature is between the room temperature and recrystallization temperature of metals or between the room temperature and glass transition temperature (Tg) of plastics. A first fluid pressure is generated on the first surface of the thin sheet material while a second fluid pressure is generated on the second surface of the thin sheet material. There is a first pressure difference between the first fluid pressure and the second fluid pressure. Owing to the first pressure difference, the thin sheet material is deformed from the first surface toward the second surface until the second surface is in contact with the preform mold cavity to form a preform with a first cavity. At least one compensation portion is formed on a bottom of the preform.

The final-forming step includes the following steps. First maintain a temperature of the preform at the working temperature and mounting the thin sheet material into the final-forming mold. Then a third fluid pressure is generated on the first surface of the thin sheet material while a fourth fluid pressure is generated on the second surface of the thin sheet material. There is a second pressure difference between the third fluid pressure and the fourth fluid pressure. By means of the second pressure difference, the preform is deformed from the first surface toward the second surface until the second surface is in contact with the final-forming mold cavity to form a final formed part with a second cavity. A shape of the second cavity matches a shape of a battery core for mounting the battery core. At last, take the final formed part out of the final final-forming mold and cool down to the room temperature naturally.

Preferably, a method of forming a shell of a soft pack battery according to the present invention further includes a step of arranging the preform mold and the final-forming mold in parallel to form a progressive die and forming the perform and the final formed part continuously by a progressive die process.

The preforming step includes a step of heating the thin sheet material up to the working temperature.

Preferably, a method of forming a shell of a soft pack battery according to the present invention further includes a step of providing the perform mold able to be heated and the final-forming mold able to be heated and using the perform mold and the final-forming mold for heating the thin sheet material to the working temperature.

Preferably, a method of forming a shell of a soft pack battery according to the present invention further includes a step of forming a protrusion on a bottom of an inner surface of the preform mold cavity so that the compensation portion is formed and projecting from the bottom of the preform due to the protrusion.

The fluid pressure comes from pneumatic or hydraulic pressure.

The preforming step further includes a step of forming an inclined side wall on the preform.

Preferably, a method of forming a shell of a soft pack battery according to the present invention further includes a step of dynamically adjusting the first pressure difference and/or the second pressure difference.

Preferably, in a method of forming a shell of a soft pack battery according to the present invention, the first pressure difference and/or the second pressure are/is increased along with increasing time.

Preferably, in a method of forming a shell of a soft pack battery according to the present invention, the first pressure difference and/or the second pressure are/is decreased along with increasing time.

Preferably, a method of forming a shell of a soft pack battery according to the present invention further includes a step of forming a diamond-like carbon (DLC) coating on an inner wall of both the preform mold cavity and the final-forming mold cavity.

A method of forming a shell of a soft pack battery according to the present invention features on that the shell of the soft pack battery formed by the present method has a depth-thickness ratio no less than 75 (≥75) and local thinning rate no more than 30 (≤30%). A material-left design is used in the preforming step and at least one compensation portion is formed on the bottom of the preform for compensation of deformation at corners of a bottom of the final molded part. Thus a thickness thinning rate of the final molded part is maintained less than 30% to avoid excessive thinning or local thinning, even breakage of the shell of the soft pack battery. Therefore, the yield rate is increased.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 7-1-FIG. 7-8 are schematic drawings showing continuous actions of steps of an embodiment according to the present invention.

DETAILED DESCRIPTION OF THE PREFERRED EMBODIMENT

In order to learn technical content, purposes and functions of the present invention more clearly and completely, please refer to the following detailed descriptions with the figures and reference signs. The followings are preferred embodiments of the present invention, only intended to illustrate the invention and not to limit the scope of the invention.

In a preferred embodiment, a method of forming a shell of a soft pack battery according to the present invention includes a material preparing step S1, a preforming step S2, and a final-forming step S3. Basically, a method of forming a shell of a soft pack battery according to the present invention has the following features.

Firstly, the shell of the soft pack battery is manufactured by a two-stage process. At the first stage, a preform is formed by the preforming step S2. At the second stage, the preform is molded to a final formed part by the final-forming step. A material-left design is used in the preforming step and at least one compensation portion is formed on a bottom of the preform for compensation of deformation and thinning at corners of a bottom of the final molded part. Thereby a thickness thinning rate of the final molded part is maintained less than 30% to avoid excessive thinning, even breakage of the final molded part.

Moreover, the shell of the soft pack battery is formed using fluid pressure. During manufacturing of the shell, two sides of the thin sheet material are applied with different fluid pressures. By means of pressure difference, the thin sheet material is deformed evenly and gradually under uniform force. Thus a preform and a final formed part are respectively formed in the first and the second stages. Thereby breakage and local thinning of the thin sheet material can be avoided and yield rate is increased.

Furthermore, according to the thin sheet material used, formation of the preform and the final formed part is performed at suitable working temperature which is between the room temperature and recrystallization temperature of metals when the thin sheet material is metal, or between the room temperature and glass transition temperature (Tg) of plastics when the thin sheet material is aluminum-plastic film. An area of the preform can be increased evenly into an area of the final formed part. In the final-forming step, a surface of the final-forming mold cavity is directly covered by the thin sheet material. Thus relative movement of the thin sheet material to the surface of the final-forming mold cavity is reduced and friction generated is further decreased. Therefore, the thin sheet material will not be broken easily.

Figure 5:
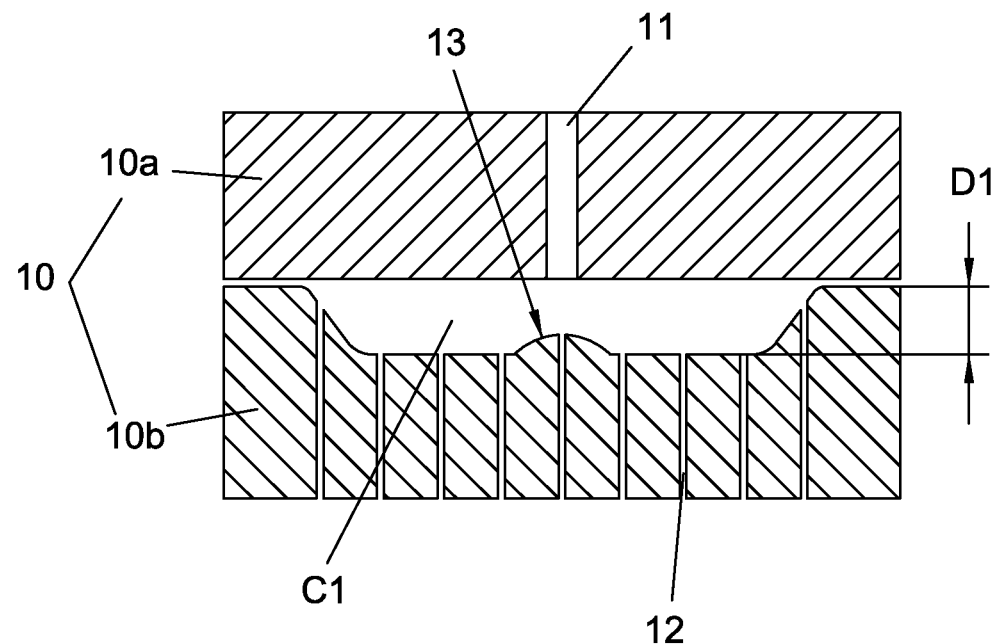
FIG. 5 is a sectional view of a preform mold of an embodiment according to the present invention.
Figure 6:
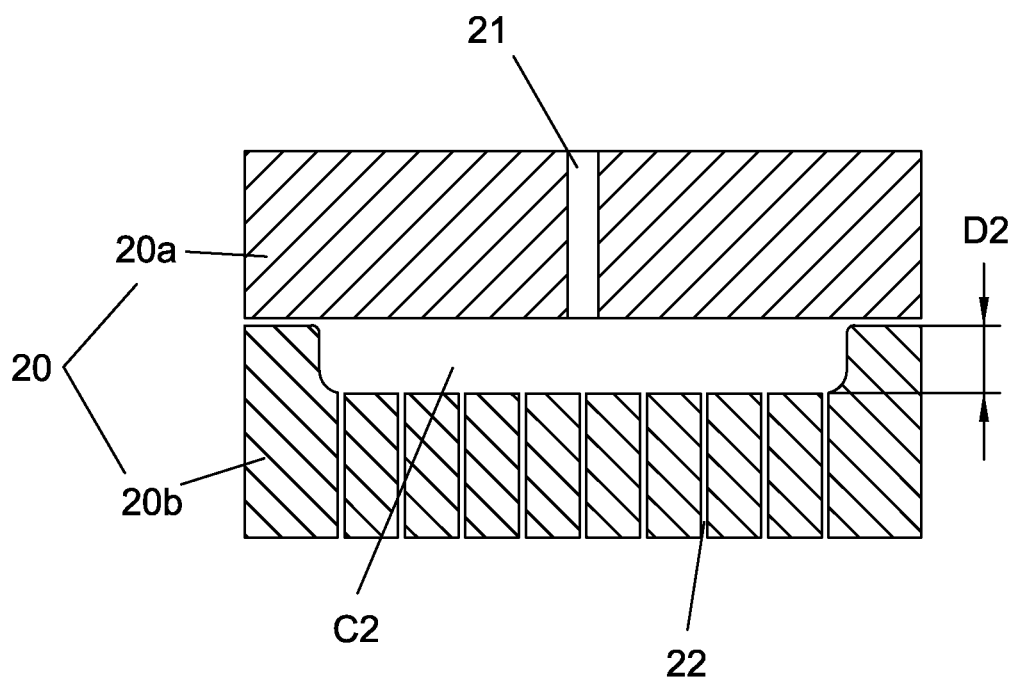
FIG. 6 is a sectional view of a final-forming mold of an embodiment according to the present invention.

Refer to FIG. 5, FIG. 6, and FIG. 7-1, sectional views of a preform mold and a final-forming mold of an embodiment according to the present invention are disclosed. The material preparing step S1 includes a step of preparing a preform mold 10, a final-forming mold 20, and a thin sheet material 30. The preform mold 10 is provided with a preform mold cavity C1 (as shown in FIG. 5) which is used for molding of the thin sheet material 30 into a preform 40. As shown in FIG. 6, a final-forming mold cavity C2 is mounted in the final-forming mold 20 for molding the preform 40 into a final formed part 50 which is a shell for mounting a battery core. In principle, a size of the preform 40 is smaller than that of the final formed part 50. In a preferred embodiment, a first depth D1 of the preform 40 is smaller than a second depth D2 of the final formed part 50 and D2=1.01-1.30D1.

In a preferred embodiment, the thin sheet material 30 has an original thickness T0 of 0.02 mm~0.2 mm and an elongation at room temperature of 10%~20%. A thickness of a section at the thinnest area of the final formed part 50 is T2. Both a larger depth-thickness ratio (a radio of the depth to the thickness, D2/T0) and a lower thinning rate (thinning rate is calculated as (T0-T2)/T0) are achieved reliably by the present method. Thereby the shell of the soft pack battery with the depth-thickness ratio no less than 75 (≥75) and the local thinning rate no more than 30 (≤30%) is formed and the yield rate is improved.

Figure 1:
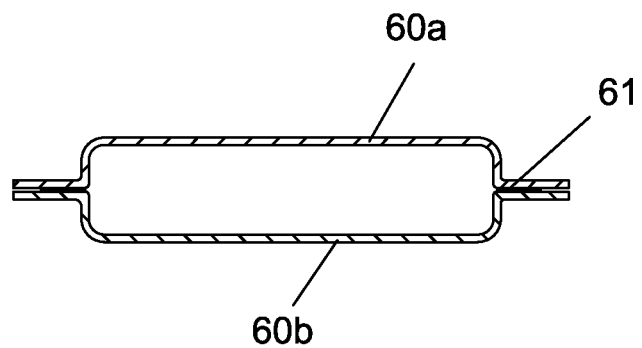
FIG. 1 is a sectional view of a shell of a soft pack battery produced by a mold with double mold cavity of a prior art.
Figures 1, 7:
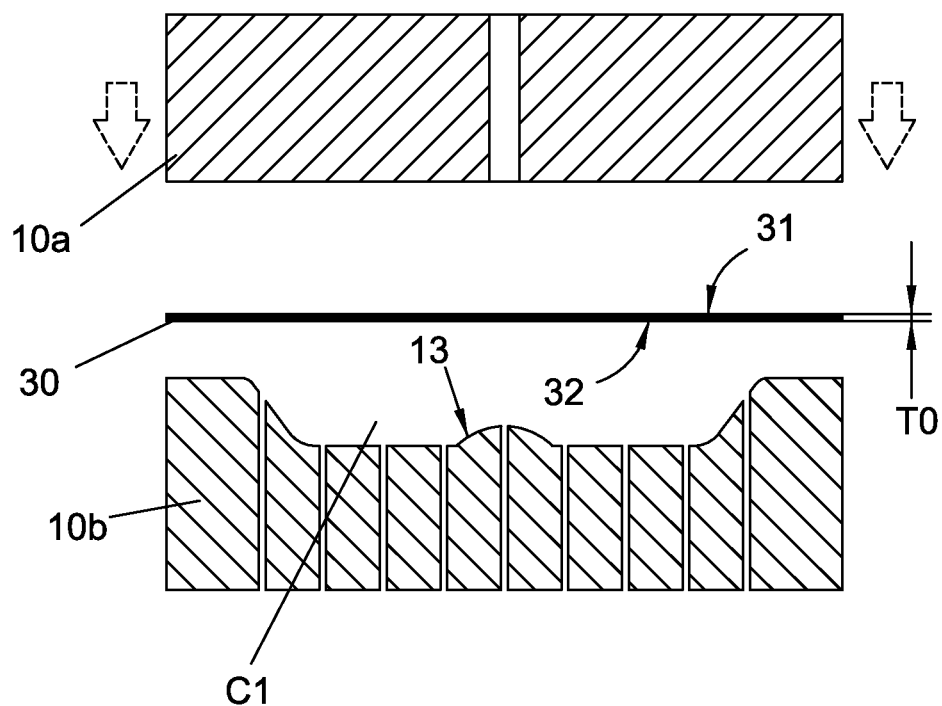
Figures 2, 7:
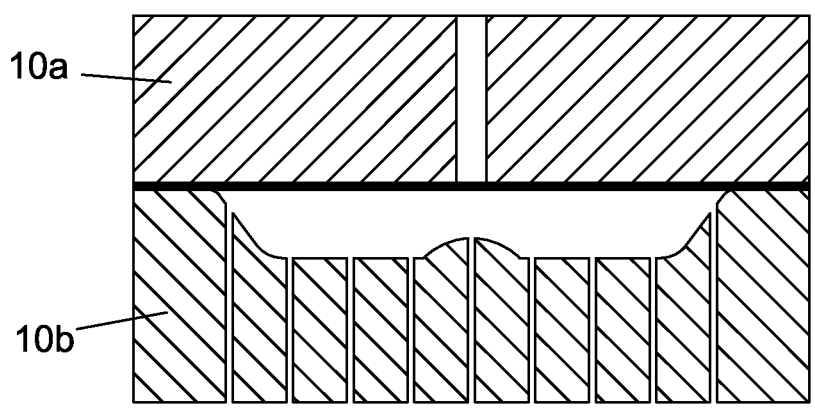
Figures 3, 7:
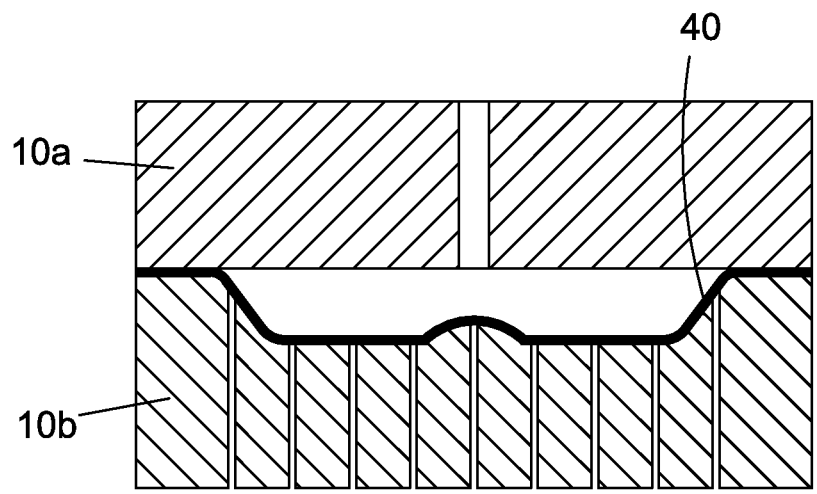
Figures 4, 7:
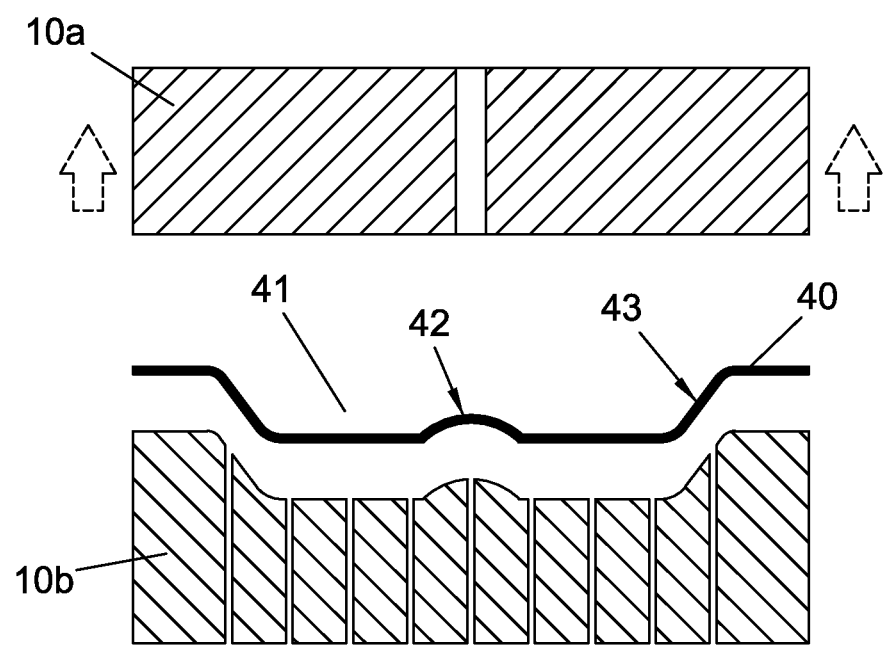
Figures 5, 7:
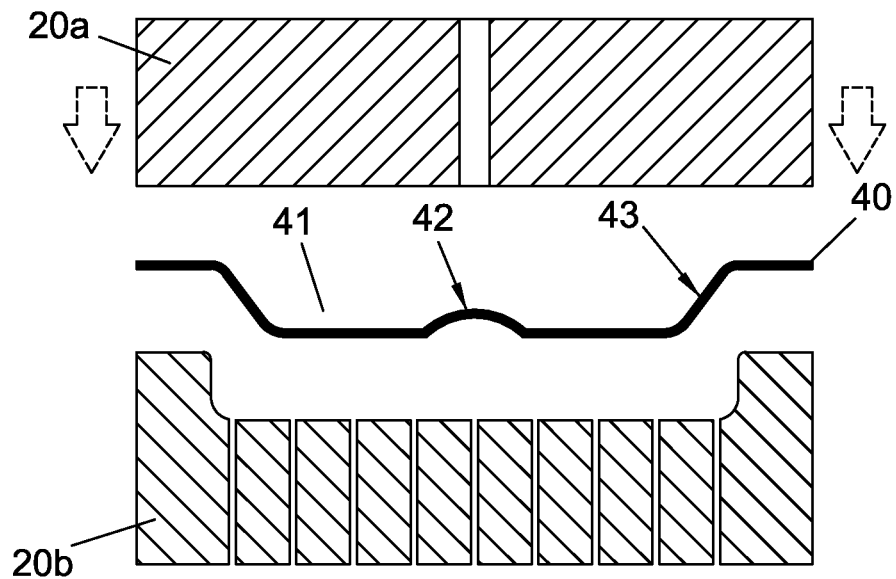
Figures 6, 7:
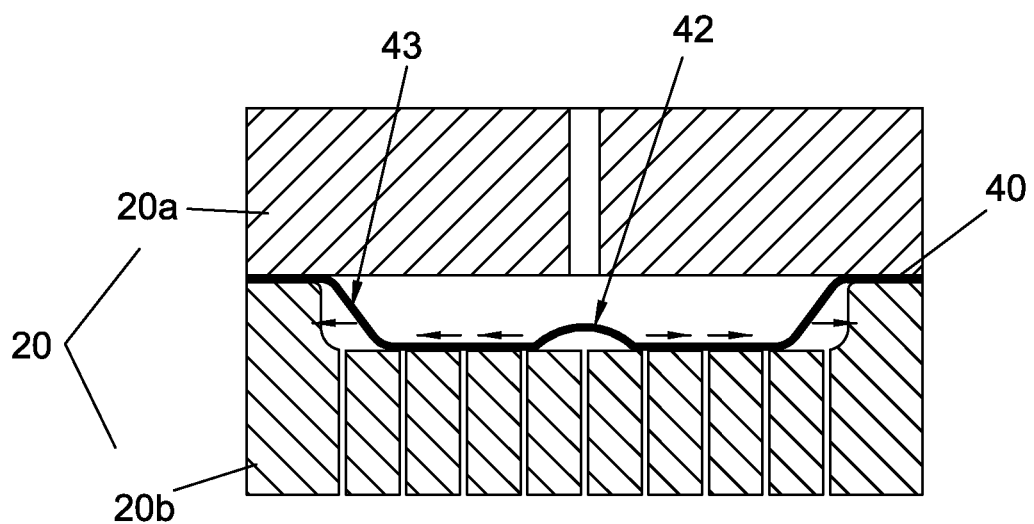
Figure 7:
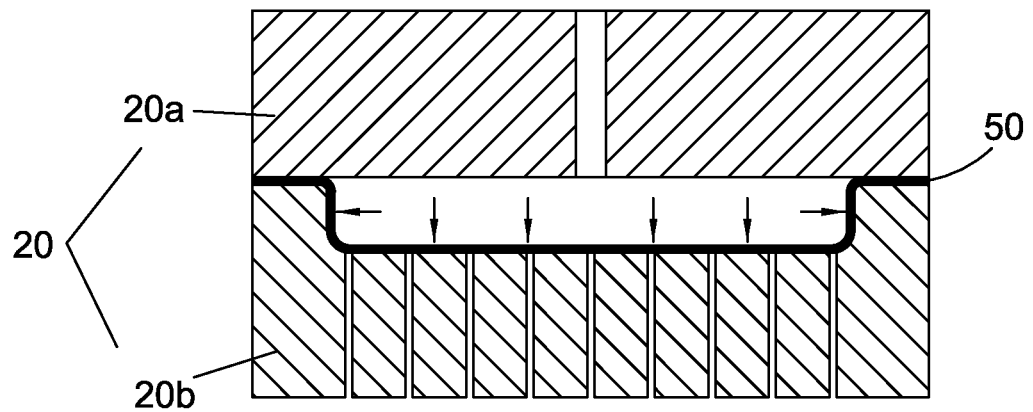

As shown in FIG. 7-1, a first surface 31 and a second surface 32 are formed on two opposite sides of the thin sheet material 30 correspondingly. The present method can be applied to not only formation of the aluminum-plastic film, but also thin metal pieces. In other words, the thin sheet material can also be stainless steel or titanium.

In a preferred embodiment, the preforming step S2 is composed of the following steps.

Figure 2:
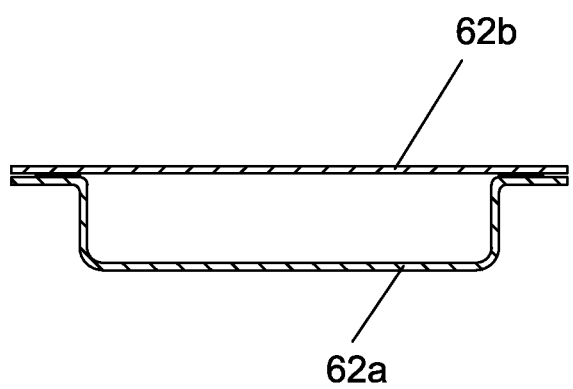
FIG. 2 is a sectional view of a shell of a soft pack battery produced by a mold with single mold cavity of a prior art.

S2.1 adjusting a temperature of the thin sheet material 30 to a working temperature and mounting the thin sheet material 30 into the preform mold 10 (as shown in FIG. 7-1 and FIG. 7-2) while the working temperature is between the room temperature and recrystallization temperature of the thin sheet material 30, or between the room temperature and glass transition temperature (Tg) of plastics. The aluminum plastic film mainly includes three layers, a polyamide (PA) layer as a protective layer, an aluminum (Al) layer, and a cast polypropylene (CPP) film. The glass transition temperature (Tg) of the plastic is the glass transition temperature of the protective layer such as polyamide (Nylon) which is 57° C.

Figure 3:
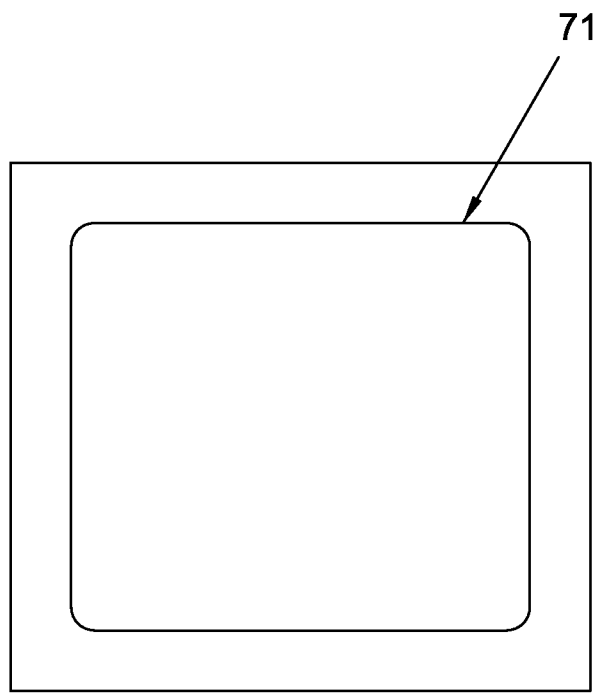
FIG. 3 is a schematic drawing showing a rectangular shell of a conventional soft pack battery.
Figure 4:
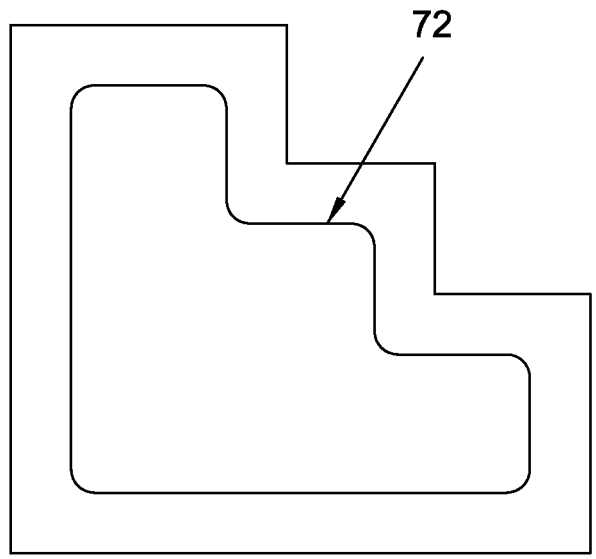
FIG. 4 is a schematic drawing showing a shell with a complicated shape of a conventional soft pack battery.

S2.2 generating a first fluid pressure and a second fluid pressure respectively on the first surface 31 and the second surface 32 of the thin sheet material 30. There is a first pressure difference between the first fluid pressure and the second fluid pressure. Owing to the first pressure difference, the thin sheet material 30 is deformed from the first surface 31 toward the second surface 32 (as shown in FIG. 7-3) until the second surface 32 is in contact with the preform mold cavity C1 to form a preform 40 with a first cavity 41 (as shown in FIG. 7-4). At least one compensation portion 42 is formed on a bottom of the preform 40. The maximum thinning rate (the original thickness T0—the thinnest thickness of the preform 40/the original thickness T0) of the preform 40 is smaller than 5%.

Refer to FIG. 5, in a preferred embodiment, the preform mold 10 includes an upper mold 10a and a lower mold 10b provided with a preform mold cavity C1. The lower mold 10b is covered with the upper mold 10a for pressing the thin sheet material 30 firmly between the upper mold 10a and the lower mold 10b (as shown in FIG. 7-2). The second surface 32 of the thin sheet material 30 is facing toward the preform mold cavity C1. The upper mold 10a and the lower mold 10b are respectively provided with a first channel 11 and a second channel 12 while the second channel 12 is communicating with the preform mold cavity C1 and the outside. Both the first channel 11 and the second channel 12 are connected with fluid pressure sources by a valve which is controllable to be on or off (such as pneumatic solenoid valve or hydraulic solenoid valve) for obtaining fluid pressure which can be pneumatic or hydraulic pressure. In a preferred embodiment, the fluid pressure required by the present method is provided by pneumatic pressure. The fluid pressure enters into the preform mold 10 through the first channel 11 so that the first fluid pressure is generated on the first surface 31 of the thin sheet material 30. Similarly, the fluid pressure enters the inside of the preform mold 10 through the second channel 12 so that the second fluid pressure is generated on the second surface 32 of the thin sheet material 30. There is a first pressure difference between the first fluid pressure and the second fluid pressure.

The preforming step uses the material-left design. As shown in FIG. 5, a protrusion 13 is arranged at a bottom of an inner surface of the preform mold cavity C1 so that a compensation portion 42 projecting from a bottom of the preform 40 (as shown in FIG. 7-4) is formed. The arrangement of the compensation portion 42 is in order to reserve more material on the bottom of the preform 40 so that the perform 40 becomes into the final formed part 50 in the final-forming step by overmolding, instead of stretch forming Thus not only effects of friction generated due to normal pressure are reduced, both breakage and local thinning of the shell can be avoided. Therefore, the yield rate is further increased. Refer to FIG. 7-4, in a preferred embodiment, an inclined side wall 43 is formed on the preform 40 in order to reduce the friction.

In a preferred embodiment, the final-forming step S3 consists of the following steps.

Figures 7, 8:
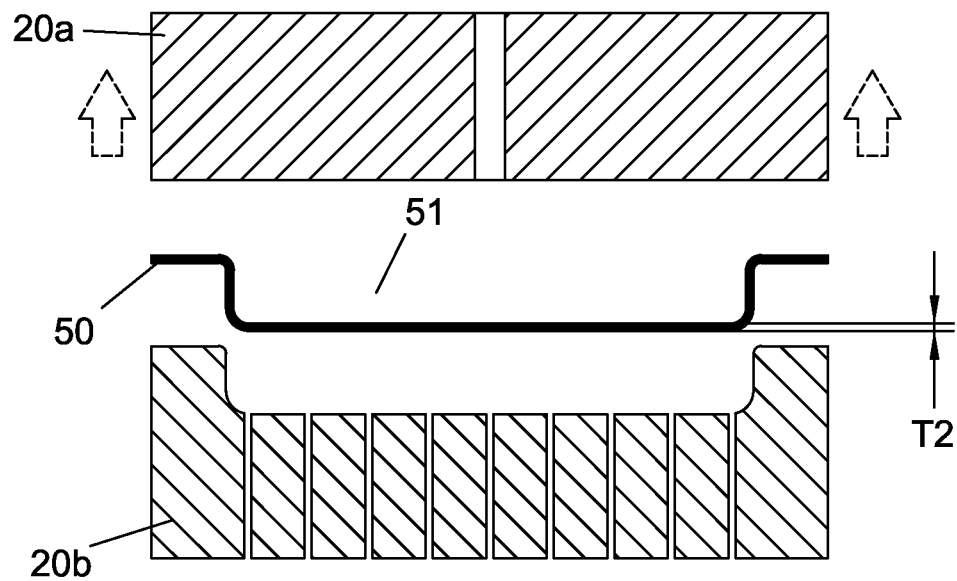

S3.1 maintaining a temperature of the preform 40 at the working temperature and disposing the preform 40 into the final-forming mold 20 (as shown in FIG. 7-5, and FIG. 7-6);

S3.2 generating a third fluid pressure and a fourth fluid pressure respectively on the first surface 31 and the second surface 32. There is a second pressure difference between the third fluid pressure and the fourth fluid pressure. By means of the second pressure difference, the preform 40 is deformed from the first surface 31 toward the second surface 32 (as shown in FIG. 7-6) until the second surface 32 is in contact with the final-forming mold cavity C2 to form a final formed part 50 with a second cavity 51 (as shown in FIG. 7-7 and FIG. 7-8). A shape of the second cavity 51 matches that of the battery core so that the second cavity 51 is used to mount the battery core.

S3.3 taking the final formed part 50 out of the final-forming mold 20 and then cooling down to the room temperature naturally (as shown in FIG. 7-8).

In a preferred embodiment, a method of the present invention further includes a step of dynamically adjusting the first pressure difference and/or the second pressure difference for applying even forming pressure to the thin sheet material 30. In a preferred embodiment, the dynamic adjustment is to increase the first pressure difference and/or the second pressure along with increasing time. In another embodiment, the dynamic adjustment is to decrease the first pressure difference and/or the second pressure along with increasing time.

Refer to FIG. 6, a preferred embodiment of the final-forming mold consists of an upper mold 20a and a lower mold 20b provided with a final-forming mold cavity C2. The upper mold 20a which covers the lower mold 20b is located on top of the lower mold 20b for pressing the preform 40 firmly between the upper mold 20a and the lower mold 20b. The second surface 32 is facing toward the final-forming mold cavity C2. The upper mold 20a and the lower mold 20b are respectively provided with a third channel 21 and a fourth channel 22 while the fourth channel 22 is communicating with the final-forming mold cavity C2 and the outside. Both the third channel 21 and the fourth channel 22 are connected with fluid pressure sources by a valve which is controllable to be on or off (such as pneumatic solenoid valve or hydraulic solenoid valve) for getting fluid pressure which can be pneumatic or hydraulic pressure. In a preferred embodiment, the fluid pressure used in the present method is provided by pneumatic pressure. The fluid pressure enters into the final-forming mold 20 through the third channel 21 so that the third fluid pressure is generated on the first surface 31 while the fluid pressure enters the inside of the final-forming mold 20 through the fourth channel 22 so that the fourth fluid pressure is generated on the second surface 32.

In a preferred embodiment, a method according to the present invention further includes a step of forming a diamond-like carbon (DLC) coating on an inner wall of both the preform mold cavity C1 and the final-forming mold cavity C2. For example, a vertical surface of both the preform mold cavity C1 and the final-forming mold cavity C2 is coated with the DLC coating to reduce friction of the thin sheet material 30 in the preform mold cavity C1 and the final-forming mold cavity C2 generated during forming process.

In a preferred embodiment, the method further includes a step of heating the thin sheet material 30 directly to reach the working temperature. In another embodiment, the method further includes a step of providing the perform mold 10 able to be heated and the final-forming mold 20 able to be heated for heating the thin sheet material 30 to the working temperature.

In a preferred embodiment, the preform mold 10 and the final-forming mold 20 are arranged in parallel and combined to form a progressive die. Thus the perform 40 and the final formed part 50 are formed continuously by a progressive die process. Therefore, the shell of the soft pack battery is produced continuously and more efficiently.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:
1. A method of forming a shell of a soft pack battery comprising the steps of:
   a material preparing step which includes a step of preparing a thin sheet material, a preform mold, and a final-forming mold; two opposite sides of the thin sheet material are provided with a first surface and a second surface correspondingly; the preform mold and the final-forming mold are respectively provided with a preform mold cavity and a final-forming mold cavity while a first depth of the preform mold cavity is smaller than a second depth of the final-forming mold cavity; wherein the thin sheet material is selected from the group consisting of aluminum-plastic film, stainless steel, and titanium and having a thickness of 0.02 mm-0.2 mm and an elongation at room temperature of 10%-20%;
   a preforming step which includes steps of
      adjusting a temperature of the thin sheet material to a working temperature and mounting the thin sheet material into the preform mold while the second surface of the thin sheet material is facing toward the preform mold cavity; and
      generating a first fluid pressure and a second fluid pressure respectively on the first surface and the second surface of the thin sheet material while there is a first pressure difference between the first fluid pressure and the second fluid pressure; owing to the first pressure difference, the thin sheet material is deformed from the first surface toward the second surface until the second surface is in contact with the preform mold cavity to form a preform with a first cavity; wherein the working temperature is between room temperature and recrystallization temperature of the thin sheet material, or between the room temperature and glass transition temperature of plastics;
      wherein a bottom of the preform is provided with at least one compensation portion;
   a final-forming step having the steps of:
      maintaining a temperature of the preform at the working temperature and disposing the preform into the final-forming mold while the second surface is facing toward the final-forming mold cavity; and
      generating a third fluid pressure and a fourth fluid pressure respectively on the first surface and the second surface while there is a second pressure difference between the third fluid pressure and the fourth fluid pressure; owing to the second pressure difference, the preform is deformed from the first surface toward the second surface until the second surface is in contact with the final-forming mold cavity to form a final formed part with a second cavity; and
      taking the final formed part out of the final-forming mold and then cooling down to the room temperature naturally.

2. The method as claimed in claim 1, wherein the method further includes a step of arranging the preform mold and the final-forming mold in parallel to form a progressive die and forming the perform and the final formed part continuously by a progressive die process.

3. The method as claimed in claim 1, wherein the second depth is 1.01-1.30 times of the first depth.

4. The method as claimed in claim 1, wherein the preforming step further includes a step of heating the thin sheet material up to the working temperature.

5. The method as claimed in claim 1, wherein the method further includes a step of providing the perform mold able to be heated and the final-forming mold able to be heated and using the perform mold able to be heated and the final-forming mold able to be heated to heat the thin sheet material to the working temperature.

6. The method as claimed in claim 1, wherein the method further includes a step of forming a protrusion on a bottom of an inner surface of the preform mold cavity so that the compensation portion is formed and projecting from the bottom of the preform due to the protrusion.

7. The method as claimed in claim 1, wherein the fluid pressure is pneumatic pressure or hydraulic pressure.

8. The method as claimed in claim 1, wherein the preforming step further includes a step of forming an inclined side wall on the preform.

9. The method as claimed in claim 1, wherein the method further includes a step of dynamically adjusting the first pressure difference and/or the second pressure difference.

10. The method as claimed in claim 9, wherein the first pressure difference and/or the second pressure are/is increased along with increasing time.

11. The method as claimed in claim 9, wherein includes the first pressure difference and/or the second pressure are/is decreased along with increasing time.

12. The method as claimed in claim 1, wherein the method further includes a step of forming a diamond-like carbon (DLC) coating on an inner wall of both the preform mold cavity and the final-forming mold cavity.

* * * * *